US010606683B1

(12) United States Patent
Culibrk et al.

(10) Patent No.: US 10,606,683 B1
(45) Date of Patent: Mar. 31, 2020

(54) CRASH CLUSTERING CALL STACKS WITH GAME STATE DATA

(71) Applicant: Electronic Arts Inc., Redwood City, CA (US)

(72) Inventors: Milan Culibrk, Coquitlam (CA); Martin Talbot, Vancouver (CA)

(73) Assignee: Electronic Arts Inc., Redwood City, CA (US)

( * ) Notice: Subject to any disclaimer, the term of this patent is extended or adjusted under 35 U.S.C. 154(b) by 183 days.

(21) Appl. No.: 15/792,413

(22) Filed: Oct. 24, 2017

(51) Int. Cl.
*G06F 11/00* (2006.01)
*G06F 11/07* (2006.01)
*A63F 13/79* (2014.01)
*A63F 13/49* (2014.01)
*G06N 20/00* (2019.01)

(52) U.S. Cl.
CPC .......... *G06F 11/079* (2013.01); *A63F 13/49* (2014.09); *A63F 13/79* (2014.09); *G06F 11/0706* (2013.01); *G06F 11/0751* (2013.01); *G06F 11/0778* (2013.01); *G06N 20/00* (2019.01)

(58) Field of Classification Search
CPC .............. G06F 11/079; G06F 11/0709; G06F 11/0751; G06F 11/0778; G06F 11/0766; G06F 11/0784; G06F 11/0793; G06F 11/0781; A63F 13/49; A63F 13/79; G06N 20/00
See application file for complete search history.

(56) References Cited

U.S. PATENT DOCUMENTS

2007/0105607 A1* 5/2007 Russell ............... G06F 11/0709 463/1
2012/0137182 A1* 5/2012 Zhang ................ G06F 11/0775 714/48

OTHER PUBLICATIONS

Podgurski, Andy etal., Automated Support for Classifying Software Failure Reports, 2003, Proceedings of the 25th International Conference on Software Engineering, pp. 1-11 (Year: 2003).*

* cited by examiner

*Primary Examiner* — Joseph D Manoskey
(74) *Attorney, Agent, or Firm* — McDermott Will & Emery LLP

(57) ABSTRACT

Methods for providing crash clustering with game state data are provided. In one aspect, a method includes receiving a plurality of crash reports associated with an application, wherein each of the plurality of crash reports includes a call stack and a plurality of game state parameters. The method also includes determining, by a machine learning algorithm, a plurality of clusters for grouping the plurality of crash reports, wherein each of the plurality of clusters is associated with at least one game state parameter of the plurality of game state parameters. The method also includes associating each of the plurality of crash reports with one of the plurality of clusters. The method also includes selecting a priority cluster from the plurality of clusters. The method also includes causing a quality assurance action to be performed based on the selected priority cluster. Systems and machine-readable media are also provided.

19 Claims, 8 Drawing Sheets

CRASH CLUSTERING CALL STACKS WITH GAME STATE DATA

TECHNICAL FIELD

The present disclosure generally relates to improving application program reliability, and more specifically relates to crash clustering call stacks with game state data.

BACKGROUND

With the continuous refinement of semiconductor technology and the shrinking of process nodes, computing devices such as central processing units (CPUs) and graphical processing units (GPUs) can achieve higher performance in smaller form factors. To take advantage of these performance gains, application programs have continued to grow in scope and complexity. As a result, bugs and crashes are almost inevitable in modern application programs. Ensuring quality assurance (QA), including testing and debugging, becomes a challenge as the QA process still needs to adhere to time, budget, and personnel constraints. This pressure is keenly felt in the videogame industry, where it is difficult to predict and test all possible gameplay scenarios, player behaviors, software and hardware interactions, and other factors.

The description provided in the background section should not be assumed to be prior art merely because it is mentioned in or associated with the background section. The background section may include information that describes one or more aspects of the subject technology.

SUMMARY

The disclosed system provides efficiently targeted quality assurance for improving the reliability and stability of game applications. A database of crash reports is organized into clusters based on machine learning algorithms, wherein the crash reports include not only call stack data, but game state data as well. A larger cluster with more crash reports can be selected for prioritized quality assurance. Testing environments can be built to recreate and test the crash conditions for the selected cluster. Mitigating actions and enhanced telemetry can also be applied for clients in live production environments.

According to certain aspects of the present disclosure, a computer-implemented method is provided. The method includes receiving a plurality of crash reports associated with an application, wherein each of the plurality of crash reports includes a call stack and a plurality of game state parameters. The method also includes determining, by a machine learning algorithm, a plurality of clusters for grouping the plurality of crash reports, wherein each of the plurality of clusters is associated with at least one game state parameter of the plurality of game state parameters. The method also includes associating each of the plurality of crash reports with one of the plurality of clusters. The method also includes selecting a priority cluster from the plurality of clusters based on a number of crash reports associated with the priority cluster. The method also includes causing a quality assurance action to he performed on an instance of the application based on the at least one game state parameter associated with the priority cluster.

According to certain aspects of the present disclosure, a system is provided including a memory, and a processor configured to execute instructions. When executed, the instructions cause the processor to receive a plurality of crash reports associated with an application, wherein each of the plurality of crash reports includes a call stack and a plurality of game state parameters. The instructions also cause the processor to determine, by a machine learning algorithm, a plurality of clusters for grouping the plurality of crash reports, wherein each of the plurality of clusters is associated with at least one game state parameter of the plurality of game state parameters. The instructions also cause the processor to associate each of the plurality of crash reports with one of the plurality of clusters. The instructions also cause the processor to select a priority cluster from the plurality of clusters based on a number of crash reports associated with the priority cluster. The instructions also cause the processor to cause a quality assurance action to be performed based on the at least one game state parameter associated with the priority cluster.

According to certain aspects of the present disclosure, a non-transitory machine-readable storage medium is provided that includes machine-readable instructions for causing a processor to execute a method. The method includes receiving a plurality of crash reports associated with an application, wherein each of the plurality of crash reports includes a call stack and a plurality of game state parameters. The method includes determining, by a machine learning algorithm, a plurality of clusters for grouping the plurality of crash reports, wherein each of the plurality of clusters is associated with at least one game state parameter of the plurality of game state parameters. The method includes associating each of the plurality of crash reports with one of the plurality of clusters. The method includes selecting a priority cluster from the plurality of clusters based on a number of crash reports associated with the priority cluster. The method includes causing a quality assurance action to be performed based on the at least one game state parameter associated with the priority cluster.

According to certain aspects of the present disclosure, a system is provided. The system includes a means for receiving a plurality of crash reports associated with an application, wherein each of the plurality of crash reports includes a call stack and a plurality of game state parameters. The system includes a means for determining, by a machine learning algorithm, a plurality of clusters for grouping the plurality of crash reports, wherein each of the plurality of clusters is associated with at least one game state parameter of the plurality of game state parameters, for associating each of the plurality of crash reports with one of the plurality of clusters, and for selecting a priority cluster from the plurality of clusters based on a number of crash reports associated with the priority cluster. The system includes a means for causing a quality assurance action to be performed on an instance of the application based on the at least one game state parameter associated with the priority cluster.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate aspects of the subject technology, and together with the description serve to explain the principles of the subject technology. In the drawings.

Figure 1:
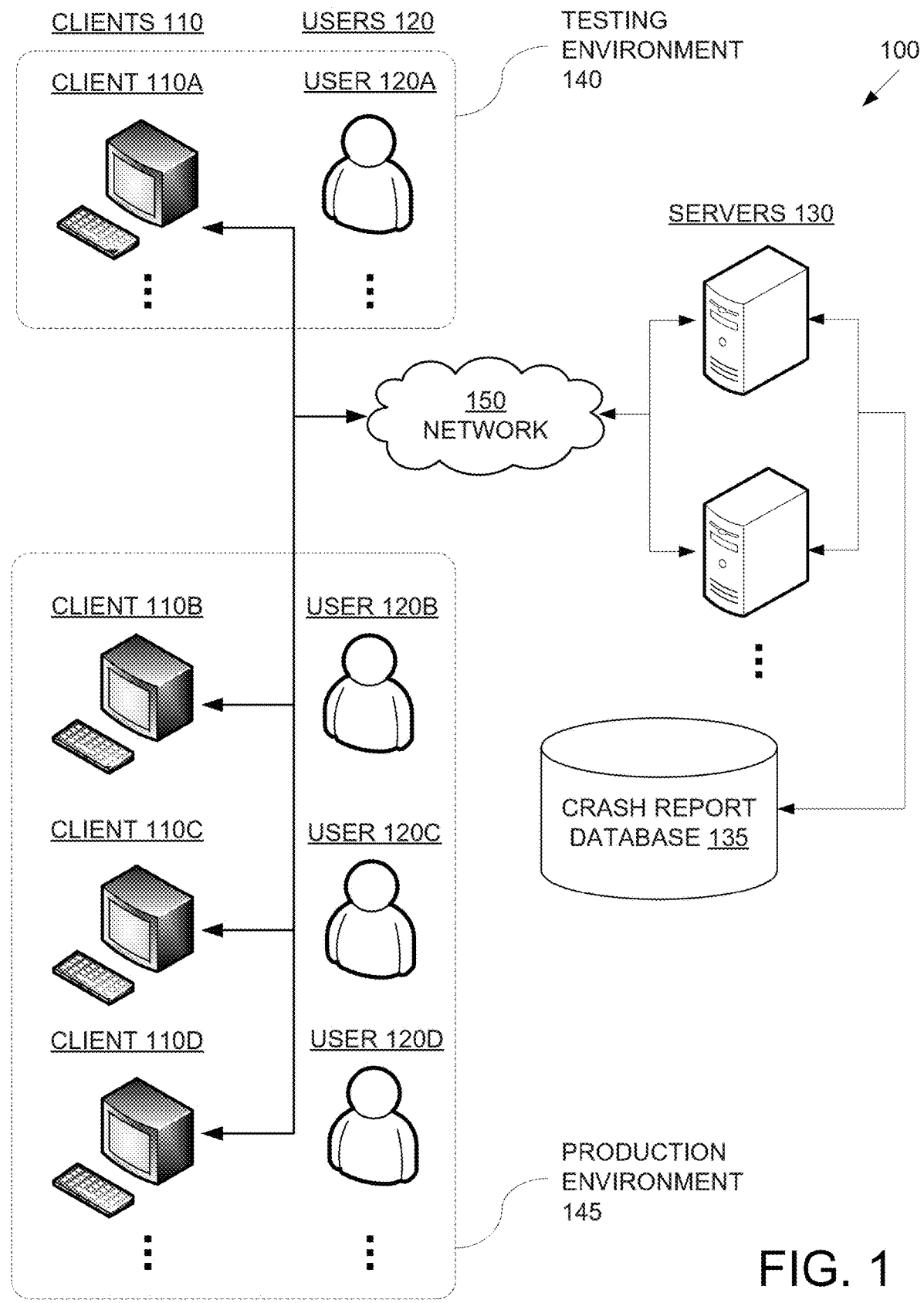
FIG. 1 illustrates an example architecture for crash clustering call stacks with game state data.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

General Overview

While crash reports can provide useful information for debugging and diagnostics, a large number of crash reports can quickly overwhelm a person's ability to process and understand the underlying bugs or issues that are causing the crashes. Accordingly, some method of organizing the crash reports is needed to focus quality assurance efforts towards solving the most common bugs or issues.

One approach to organizing crash reports is to examine the most recent function call, or the top of the call stack in the crash report. While this often helps to categorize the issue into a particular hardware or driver subsystem such as sound, video, input device, etc., this simplistic categorization often fails to identify issues that have a more insidious effect on application stability, such as memory issues or game logic bugs that can result in crashes at any time. Further, because only the topmost call is examined, many issues that arise from the same bug or problem at an earlier point in the call stack may nevertheless be categorized as separate issues. Thus, organizing crash reports by examining the top of the call stack tends to obscure useful information while providing too many distracting false positives.

The disclosed system provides efficiently targeted quality assurance for improving the reliability and stability of game applications. A database of crash reports is organized into clusters based on machine learning algorithms, wherein the crash reports include not only call stack data, but game state data as well. A larger cluster with more crash reports can be selected for prioritized quality assurance. Testing environments can be built to recreate and test the crash conditions for the selected cluster. Mitigating actions and enhanced telemetry can also be applied for clients in live production environments.

The disclosed system addresses a technical problem tied to computer technology and arising in the realm of computer networks, namely the technical problem of game application crashes reducing game application reliability and stability. The disclosed system solves this technical problem by collecting crash report data that includes call stacks and game state information. Machine learning algorithms are used to organize the crash report data into clusters that define similar bugs or problems. Larger clusters can be identified and quality assurance efforts can be effectively prioritized for these larger clusters. Quality assurance efforts may include replicating similar game state conditions in a test environment and/or performing mitigating actions for clients in a live production environment. In this manner, crashes for the game application can be effectively investigated and mitigated, improving game application reliability and stability.

Although certain examples provided herein may describe a user's diagnostic data being stored in memory, each user must grant explicit permission for such user information to be stored. The explicit permission may be granted using privacy controls integrated into the disclosed system. If requested user information includes demographic information, then the demographic information is aggregated on a group basis and not by individual user. Each user is provided notice that such user information will be stored with such explicit consent, and each user may at any time end having the user information stored, and may delete the stored user information. The stored user information may be encrypted to protect user security.

The user can at any time delete the user information from memory and/or opt out of having the user information stored in memory. Additionally, the user can, at any time, adjust appropriate privacy settings to selectively limit the types of user information stored in memory, or select the memory in which the user information is stored (e.g., locally on the user's device as opposed to remotely on a server). In many examples, the user information does not include and/or share the specific identification of the user (e.g., the user's name) unless otherwise specifically provided or directed by the user.

Example System Architecture

FIG. 1 illustrates an example architecture 100 for crash clustering call stacks with game state data. The architecture 100 includes clients 110 and servers 130 connected over a network 150. Servers 130 may connect and communicate with crash report database 135, for example over a local intranet. In some aspects of the subject technology, servers 130 may instead connect to crash report database 135 over network 150. Users 120 may interact with respective clients 110. Client 110A may be part of testing environment 140, whereas client 110B, 110C, and 110D may be part of production environment 145.

The clients 110 may each execute a separate instance of a game application that includes a crash exception handler. Upon a crash, the crash exception handler may be triggered to generate a crash report. The crash report may include the contents of a call stack, which may include a hierarchy of functions or subroutines that were called up to the time of the crash, along with any metadata such as stored register values, function parameter values, and so forth. The call stack may be stored as binary values or hexadecimal values in strings, which can be resolved to human readable function calls using symbols.

The crash report may also include one or more game state parameters pertaining to game state at the time of the crash. The game state parameters may include, as a non-limiting list, a game mode (such as single player, co-op mode, or multiplayer), a game type (e.g, shooting stage, racing stage, or flying stage), a location (e.g. stage, level, or map coordinates), a player action, a player statistic (e.g, inventory, health, equipment, attributes, experience, or skill parameters), or a hardware configuration (e.g. operating system, processor type and speed, graphics card, memory, storage, input device, display device, network card, or network bandwidth).

After the crash report includes both the call stack and the game state parameters, the crash report can be sent over network 150 to be added to crash report database 135 via servers 130. In some aspects of the subject technology, the crash report may be stored locally and sent over network 150 after the game application is restarted.

Note that in FIG. 1, clients 110B-110D are operating in production environment 145. Thus, crash report database 135 may receive incoming crash reports from a live deployment of the game application, wherein users 120B-120D correspond to end users of the game application. On the other hand, client 110A operates in testing environment 140, wherein user 120A may correspond to a quality assurance team member for a developer of the game application. Thus, crash report database 135 may receive crash reports from both testing environment 140 and production environment 145.

The clients 110 can be any device having an appropriate processor, memory, and communications capability for executing the game application and sending the crash reports. The clients 110 to which the servers 130 are connected over the network 150 can be, for example, desktop computers, mobile computers, tablet computers (e.g., including e-book readers), mobile devices (e.g., a smartphone or PDA), set top boxes(e.g., for a television), video game consoles, or any other devices having appropriate processor, memory, and communications capabilities.

One of the many servers 130 is configured to host a crash clustering service. For the purposes of load balancing, multiple servers 130 can host the crash clustering service. In certain aspects, one or more of the servers 130 can be a cloud computing server of an infrastructure-as-a-service (IaaS), and be able to support a platform-as-a-service (PaaS) and software-as-a-service (SaaS) services.

The crash clustering service groups the crash reports within crash report database 135 into clusters by using machine learning algorithms, wherein each cluster represents a similar bug or error condition. The training data set for the machine learning algorithm may use a representative portion of the crash reports available from crash report database 135. For example, the representative portion may be selected by limiting the crash reports to a particular time period or record range. Once the crash reports in crash report database 135 are grouped according to the clusters, the crash clustering service may select a cluster with a large number of crash reports as a priority cluster. Quality assurance actions can be performed for the priority cluster to improve the stability and reliability of the game application.

The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

Example System for Providing Crash Clustering Call Stacks with Game State Data

Figure 2:
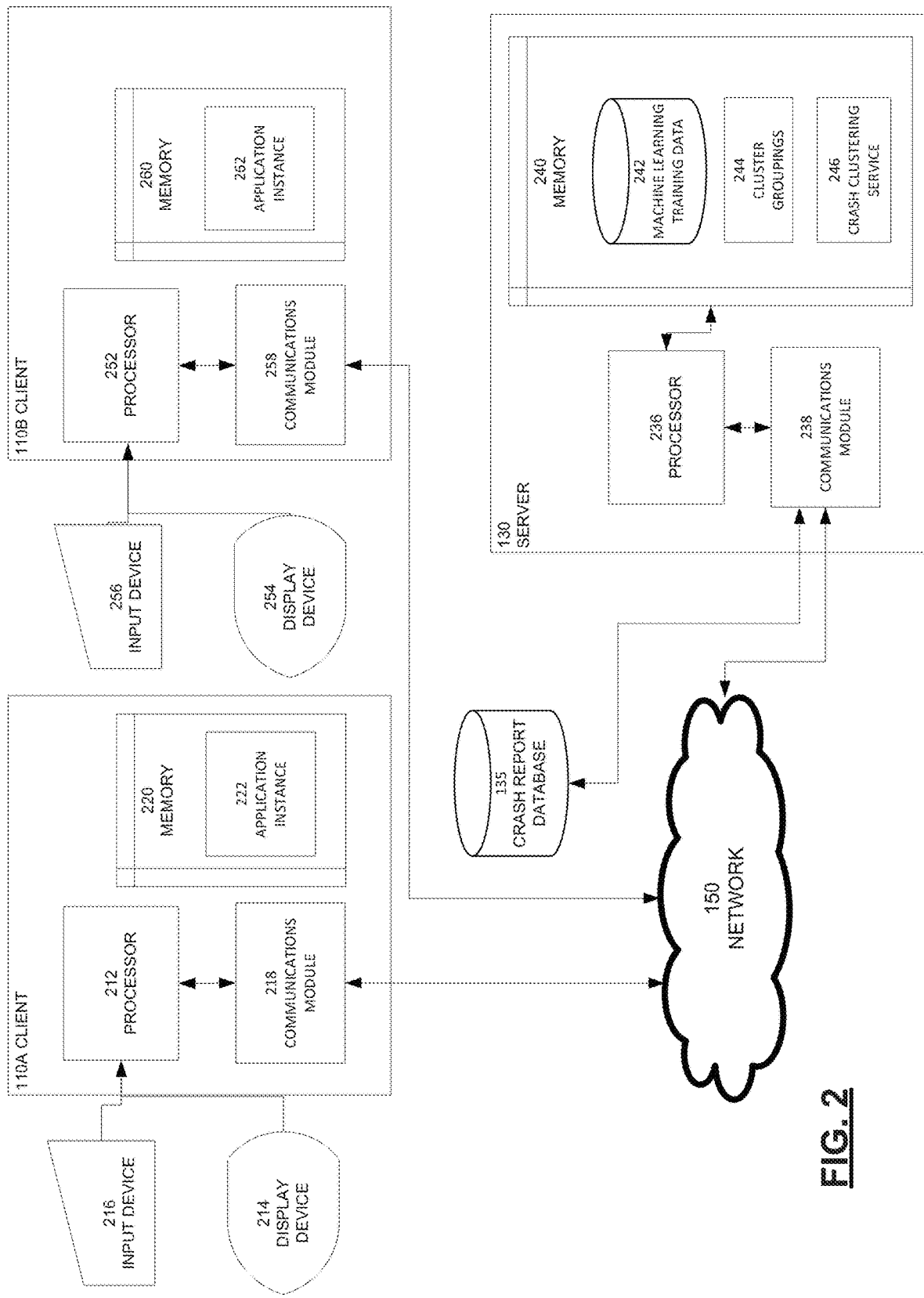
FIG. 2 is a block diagram illustrating the example clients and servers from the architecture of FIG. 1 according to certain aspects of the disclosure.

FIG. 2 is a block diagram illustrating an example server 130, client 110A and client 110B, and crash report database 135 from the architecture of FIG. 1 according to certain aspects of the disclosure. The client 110A, client 110B, and server 130 are connected over the network 150 via respective communications modules 218, 258, and 238. The communications modules 218, 258, and 238 are configured to interface with the network 150 and to receive information, such as data, requests, responses, and commands to other devices on the network. The communications modules 218, 258, and 238 can be, for example, modems or Ethernet cards. Server 130 may also communicate with crash report database 135 using communications module 238, for example, to issue database queries and add database records.

A test client, or client 110A, is associated with user 120A and includes processor 212, communications module 218, and memory 220. The client 110A also includes an input device 216, such as a keyboard or mouse, and a display device 214. The processor 212 of the client 110A is configured to execute instructions, such as instructions physically coded into the processor 212, instructions received from software in memory 220, or a combination of both. For example, the processor 212 of client 110A may execute application instance 222, corresponding to an instance of the game application to be debugged by user 120A, or a quality assurance team member. Application instance 222 may receive instructions from server 130 regarding quality assurance actions to be performed.

A live client, or client 110B, is associated with user 120B and includes processor 252, communications module 258, and memory 260. The client 110B may also include an input device 256, such as a keyboard or mouse, and a display device 254. The processor 252 of the client 110B is configured to execute instructions, such as instructions physically coded into the processor 252, instructions received from software in memory 260, or a combination of both. For example, the processor 252 of client 110B may execute application instance 262, corresponding to an instance of the game application that has been deployed to end users such as user 120B. Application instance 262 may receive instructions from server 130 regarding quality assurance actions to be performed.

Since application instance 222 of client 110A is running in testing environment 140, application instance 222 may provide more robust tracing, debugging, and crash reporting functionality compared to application instance 262 of client 110B, which runs in production environment 145. Application instance 262 may provide crash reporting functionality, but no debugging or tracing. Thus, while application instance 222 and application instance 262 correspond to the same game application, the different instances may be instantiated or compiled with different flags or options. Alternatively, application instance 222 may verify execution in testing environment 140 before exposing debugging features.

Although not specifically shown in FIG. 2, other users and associated clients may also be in communication with servers 130 over network 150. The other clients may include components similar to those shown in client 110A and client 110B in FIG. 2.

Server 130 includes processor 236, communications module 238, and memory 240, which includes machine learning training data 242, cluster groupings 244, and crash clustering service 246. The processor 236 of the server 130 is configured to execute instructions, such as instructions physically coded into the processor 236, instructions received from software in memory 240, or a combination of both.

For example, the processor 236 of the server 130 executes instructions in crash clustering service 246 to receive a plurality of crash reports associated with a game application, wherein each of the plurality of crash reports includes a call stack and a plurality of game parameters. Crash clustering service 246 may, for example, issue a database query to retrieve crash report records from crash report database 135. In some aspects of the subject technology, crash clustering service 246 may store a local cache of crash report records in memory 240, which can be synchronized with crash report database 135 as new records are added to crash report database 135.

Processor 236 of server 130 determines, by a machine learning algorithm, cluster groupings 244 for grouping the plurality of crash reports, wherein each of the plurality of clusters is associated with at least one game state parameter of the plurality of game state parameters. For example, the machine learning algorithm may correspond to k-modes clustering or k-medoids clustering. If crash report database 135 is relatively small, then all of the records from crash report database 135 can be used as machine learning training data 242 for the machine learning algorithm. However, crash report database 135 may also contain a large number of records. In this case, machine learning training data 242 may include a representative portion of the records from crash report database 135, for example, according to a time period or record range.

An example of cluster groupings 244 is illustrated below in Table 1.

TABLE 1

Example Cluster Groupings.

| Cluster Medoid | GameType | GameMode |
|---|---|---|
| 1 | multiplayer | WalkerAssault |
| 2 | Coop | SplitScreen |
| 3 | singleplayer | Coop1p |
| 4 | Coop | Coop1p |
| 5 | multiplayer | TeamDeathMatch |
| 6 | Coop | Coop2p |
| 7 | singleplayer | TeamDeathMatch |
| 8 | multiplayer | Domination |
| 9 | Coop | TeamDeathMatch |
| 10 | multiplayer | Supremacy |
| 11 | Coop | Domination |
| 12 | multiplayer | Coop2p |
| 13 | Coop | WalkerAssault |
| 14 | multiplayer | Coop1p |
| 15 | singleplayer | WalkerAssault |
| 16 | multiplayer | SplitScreen |
| 17 | singleplayer | Coop2p |
| 18 | multiplayer | TeamDeathMatchFFA |
| 19 | Coop | Supremacy |
| 20 | singleplayer | Supremacy |
| 21 | multiplayer | DeathMatch |
| 22 | singleplayer | SplitScreen |

TABLE 1-continued

Example Cluster Groupings.

| Cluster Medoid | GameType | GameMode |
|---|---|---|
| 23 | multiplayer | DropZone |
| 24 | multiplayer | Cargo |
| 25 | multiplayer | WalkerAssault |

As discussed above, the crash report records may include a number of game state parameters, of which one or more parameters may be selected from the machine learning clustering. Processor 236 may use the machine learning algorithm with machine learning training data 242 to generate cluster groupings 244. As shown in Table 1, cluster groupings 244 can be associated with two parameters: "GameType" and "GameMode."

Processor 236 of server 130 associates each of the plurality of crash reports with one of cluster groupings 244. Based on this association, a size of each cluster in cluster groupings 244 can be determined, which corresponds to a number of crash reports associated with the cluster. An example result is illustrated below in Table 2.

TABLE 2

Example Result of Associations of Crash Reports to Cluster Groupings.

| > pamcluster$clusinfo | | | | | |
|---|---|---|---|---|---|
| | size | max_diss | av_diss | diameter | separation |
| [1,] | 1506 | 0 | 0 | 0 | 0.5 |
| [2,1 | 401 | 0 | 0 | 0 | 0.5 |
| [3,1 | 12.9 | 0 | 0 | 0 | 0.5 |
| [4,] | 1963 | 0 | 0 | 0 | 0.5 |
| [5,] | 1530 | 0 | 0 | 0 | 0.5 |
| [6,] | 228 | 0 | 0 | 0 | 0.5 |
| [7:] | 95 | 0 | 0 | 0 | 0.5 |
| [8,1 | 179 | 0 | 0 | 0 | 0.5 |
| [9,] | 124 | 0 | 0 | 0 | 0.5 |
| [10,] | 3058 | 0 | 0 | 0 | 0.5 |
| [11,] | 1 | 0 | 0 | 0 | 0.5 |
| [12,] | 1 | 0 | 0 | 0 | 0.5 |
| [13,1 | 6 | 0 | 0 | 0 | 0.5 |
| [14,] | 40 | 0 | 0 | 0 | 0.5 |
| [15,] | 10 | 0 | 0 | 0 | 0.5 |
| [16,] | 5 | 0 | 0 | 0 | 0.5 |
| [17,] | 8 | 0 | 0 | 0 | 0.5 |
| [18,1 | 26 | 0 | 0 | 0 | 0.5 |
| [19,1 | 273 | 0 | 0 | 0 | 0.5 |
| [20,] | 38 | 0 | 0 | 0 | 0.5 |
| [21,] | 114 | 0 | 0 | 0 | 0.5 |
| [22,] | 13 | 0 | 0 | 0 | 0.5 |
| [23,] | 222 | 0 | 0 | 0 | 0.5 |
| [24,1 | 24 | 0 | 0 | 0 | 0.5 |
| [25,] | 6 | 0 | 0 | 0 | 0.5 |

Processor 236 of server 130 selects a priority cluster from the plurality of clusters based on a number of crash reports associated with the priority cluster. For example, referring to Table 2 above, it can be seen that cluster #10 has 3058 associated crash reports, and therefore cluster #10 may be selected as a priority cluster due to the large number of crash reports compared to the other clusters.

As a caveat, it should be noted that a larger number of crash reports does not necessarily mean that the associated cluster has the most bugs or issues. This may simply indicate that the player base favors the particular game mode associated with the cluster, which naturally results in more crash reports being categorized in that cluster. In some aspects of the subject technology, telemetry data from clients may be utilized to retrieve in-game playing patterns of the player base. This additional telemetry data may be used to weight the cluster sizes when selecting a priority cluster, for example.

Processor 236 of server 130 causes a quality assurance action to be performed based on the game state parameters associated with the priority cluster. For example, referring to Table 1 above, it can be seen that the priority cluster, or cluster #10, is associated with a "multiplayer" GameType and a "Supremacy" GameMode.

In an aspect of the subject technology, the quality assurance action is performed on an application instance, such as application instance 222 or application instance 262.

In a further aspect of the subject technology, application instance 222 is executing in testing environment 140, and the quality assurance action is configuring a game state of application instance 222, according to game state parameters associated with the priority cluster. Thus, one example quality assurance action that can be performed on application instance 222 is to execute a script to launch the game application in a game state corresponding to cluster #10, or the "multiplayer" game type and the "Supremacy" game mode. Thus, server 130 may provide the script to application instance 222 via network 150, and instruct application instance 222 to execute the script or present the script for execution by user 120A. In this manner, user 120A, or the quality assurance team member, can direct QA efforts towards the most pressing bugs or issues for the game application.

In a further aspect of the subject technology, application instance 262 is executing in production environment 145, and the quality assurance action is triggered when a game state of application instance 262 is determined to meet a similarity threshold, according to the game parameters associated with the priority cluster. For example, the quality assurance action may be a direction to minimize lost gameplay time and progress by increasing a frequency of auto-saving. Thus, server 130 may provide an instruction to application instance 262 via network 150, wherein the instruction instructs application instance 262 to perform the quality assurance action, or increase the auto-save frequency, when a similarity threshold is met for the game parameters associated with the priority cluster, or cluster #10.

For example, if the game state of application instance 262. is detected to be in the "multiplayer" GameType and "Supremacy" GameMode, application instance 262 can determine a similarity value of 100, which may exceed a threshold value of 80. As a result, application instance 262 triggers the quality assurance action, for example increasing a frequency of auto-saving from a default of once every 5 minutes to a new setting of once every 1 minute.

In a further aspect of the subject technology, the machine learning algorithm used to determine cluster groupings 244 is k-medoids clustering.

In a further aspect of the subject technology, the plurality of game state parameters in the crash reports of crash report database 135 include at least one of a game mode, a game type, a location, a player action, a player statistic, or a hardware configuration.

The techniques described herein may be implemented as method(s) that are performed by physical computing device(s), as one or more non-transitory computer-readable storage media storing instructions which, when executed by computing device(s), cause performance of the method(s), or as physical computing device(s) that are specially configured with a combination of hardware and software that causes performance of the method(s).

Figure 3:
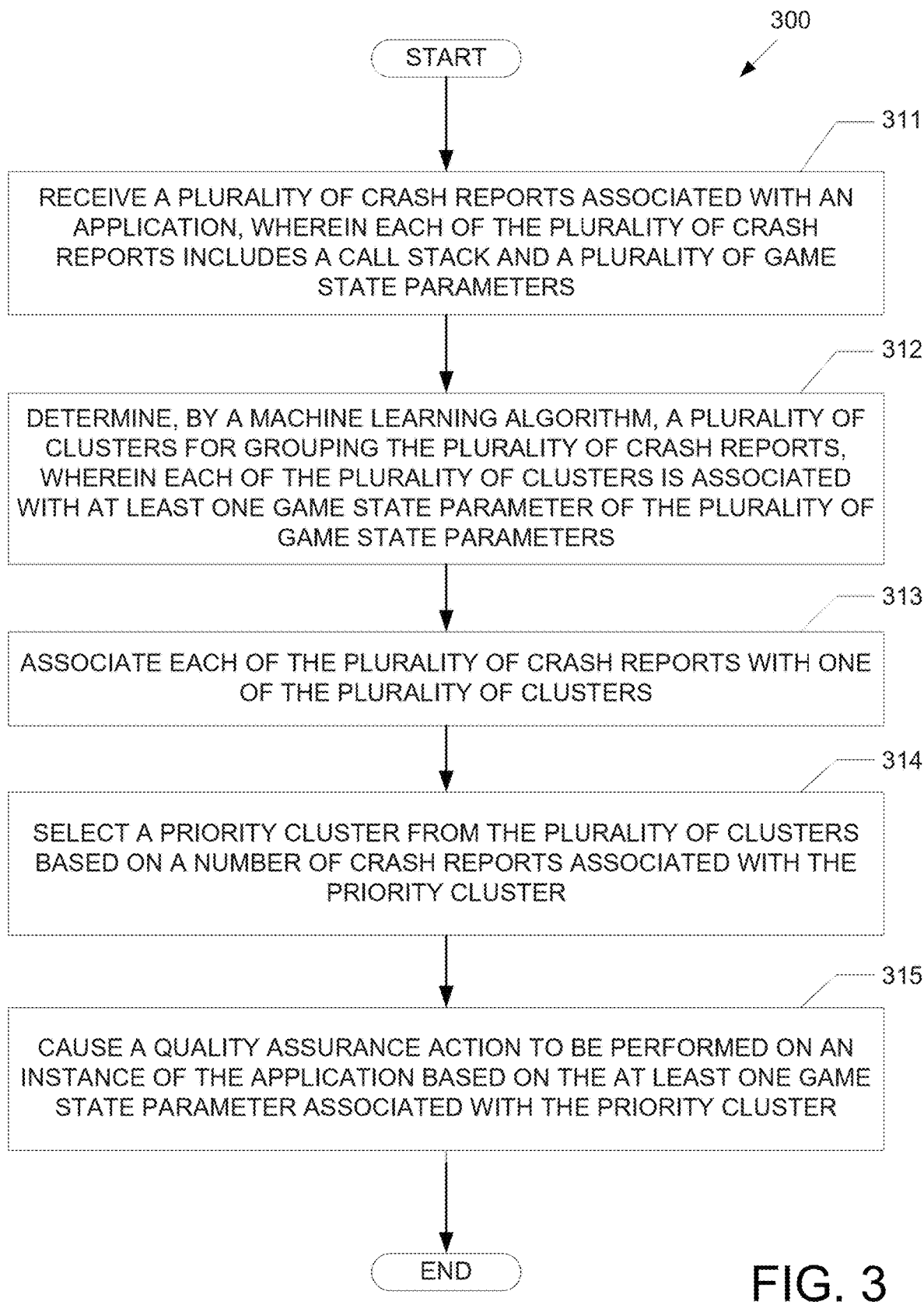
FIG. 3 illustrates an example process for providing crash clustering with game state data using the example server of FIG. 2.

FIG. 3 illustrates an example process 300 for providing crash clustering with game state data using the example server 130 of FIG. 2. While FIG. 3 is described with reference to FIG. 2, it should be noted that the process steps of FIG. 3 may be performed by other systems.

The process 300 begins by proceeding to step 311, where processor 236 receives a plurality of crash reports associated with an application, wherein each of the plurality of crash reports includes a call stack and a plurality of game state parameters. As discussed above, the crash reports may be retrieved from crash report database 135 and optionally stored in a local memory cache.

In step 312, processor 236 determines, by a machine learning algorithm, cluster groupings 244 for grouping the plurality of crash reports from step 311, wherein each of cluster groupings 244 is associated with at least one game state parameter of the plurality of game state parameters. As discussed above, a portion or the entirety of the crash reports from step 311 may be used as machine learning training data 242 for the machine learning algorithm, such as k-means or k-medoids clustering, to determine cluster groupings 244. An example cluster groupings 244 is shown in Table 1 above.

Figure 4A:
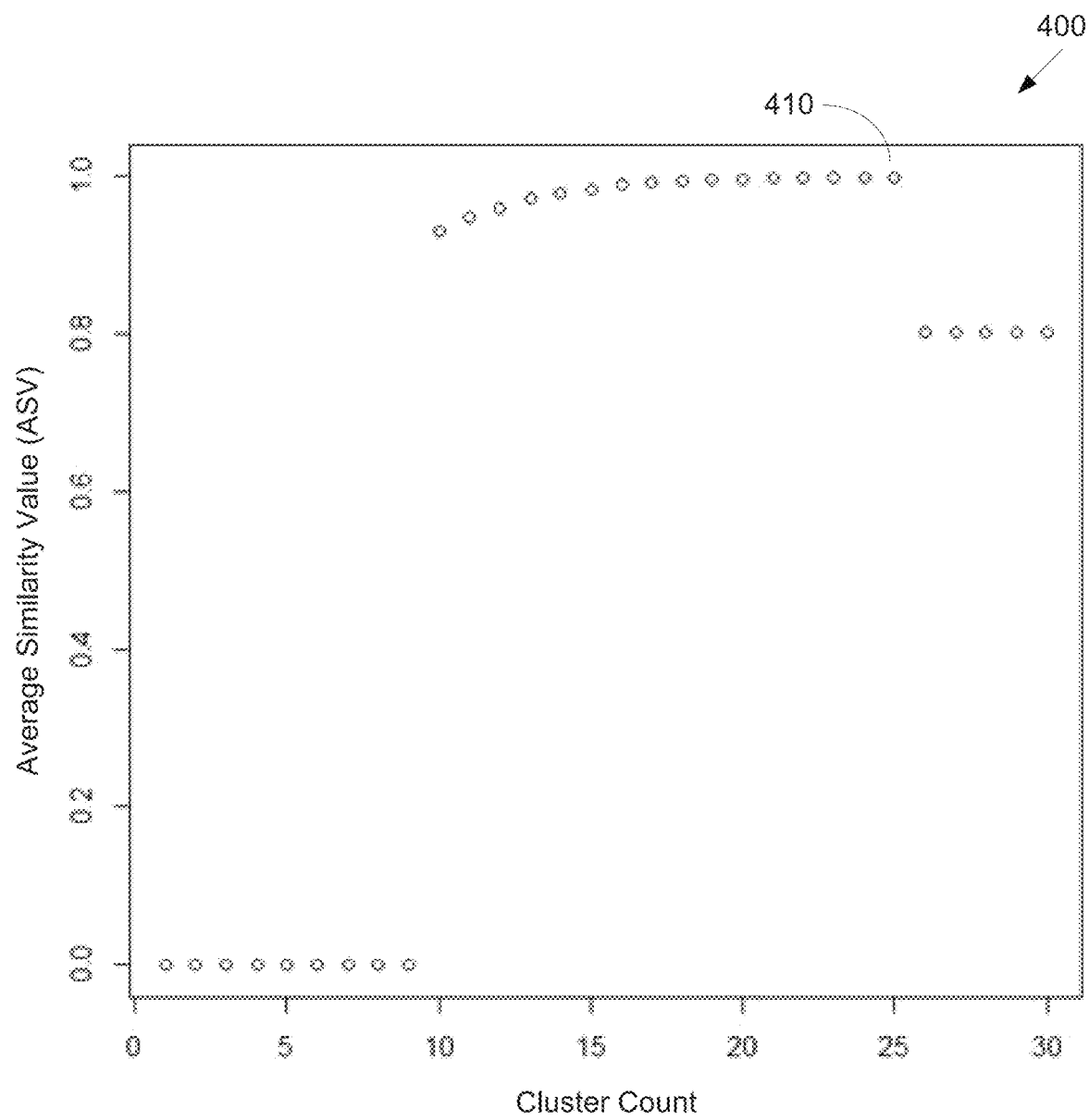
FIG. 4A illustrates an example graph of cluster counts with average similarity values (ASV) to determine an optimal number of clusters.

In some aspects of the subject technology, an optimal number of clusters for cluster groupings 244 may be determined. For example, referring to FIG. 4A, FIG. 4A illustrates an example graph 400 of cluster counts with average similarity values (ASV) to determine an optimal number of clusters.

Graph 400 may be built by iterating the machine language algorithm with a preset number of clusters. After generating a new preset number of cluster groupings in a new iteration, the members of each cluster can be examined to determine the similarity value of each cluster grouping, or how similar the members of each cluster are to each other. These similarity values can be summed and divided by the cluster count to determine the average similarity value (ASV) for that cluster count.

After the iteration finishes, for example up to a predetermined maximum count, then the cluster count with the largest ASV can be selected as the optimal number of clusters. In the example shown in FIG. 4A, this corresponds to cluster count 410, or 25 clusters as the optimal number of clusters. This is only one example approach; other approaches may be utilized to determine an optimal number of clusters.

In step 313, processor 236 associates each of the plurality of crash reports from step 311 with one of cluster groupings 244. For example, each crash report may be associated with a particular cluster in cluster groupings 244 by maximizing a similarity value for game parameters associated with the particular cluster. An example result of the association may be summarized by the data in Table 2 above.

In step 314, processor 236 selects a priority cluster from cluster groupings 244 based on a number of crash reports associated with the priority cluster. For example, the data in Table 2 may be sorted by size, and the highest ranking clusters, or cluster #10, may be selected. In some aspects of the subject technology, multiple clusters may be chosen as priority clusters, for example the top 5 largest clusters, or all clusters exceeding a minimum threshold size.

In step 315, processor 236 causes a quality assurance action to be performed on an instance of the application based on the parameters associated with the priority cluster selected in step 314. If cluster #10 is selected as the priority cluster, then the associated parameters are "multiplayer" GameType and "Supremacy" GameMode. The instance of the application may correspond to application instance 222 or application instance 262, for example.

Figure 4B:
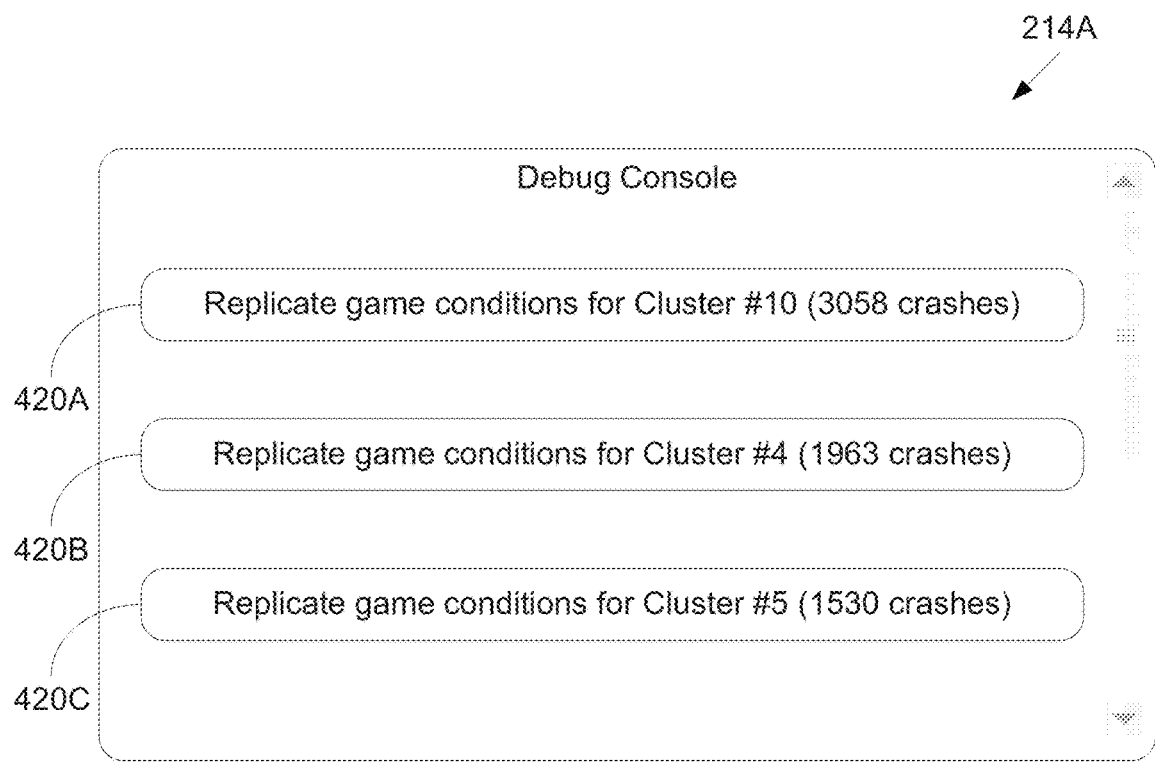
FIG. 4B illustrates an example user interface in a test environment for performing a quality assurance action.

For example, if the instance of the application corresponds to application instance 222, then the quality assurance action may configure a game state of application instance 222 according to the priority cluster by using a script, as described above. For example, referring to FIG. 4B, FIG. 4B illustrates an example user interface 214A in testing environment 140 for performing a quality assurance action. User interface 214A may be displayed on display device 214 of client 110A.

As shown in user interface 214A, the user is presented with button 420A, which replicates game conditions for Cluster #10 with 3058 crash reports, button 420B, which replicates game conditions for Cluster #4 with 1963 crash reports, and button 420C, which replicates game conditions for Cluster #5 with 1530 crash reports. Thus, the user is presented with buttons that launch scripts for configuring the game state of application instance 222 according to the most problematic clusters. In this manner, user 120A can perform efficient debugging of the game application. In other aspects of the subject technology, the scripts may be automatically launched without user input.

In another example, if the instance of the application corresponds to application instance 262, then the quality assurance action may be performed when a game state of application instance 262 meets a similarity threshold to the game parameters associated with the priority cluster. For example, one quality assurance action is to enable a telemetry function. This telemetry function may, for example, log additional game state data and user actions that can be sent to servers 130 for analysis. In this manner, additional diagnostic data can be retrieved from the game application when bugs or issues appear to be most strongly correlated, or when the game state is highly similar to the game parameters of the priority cluster.

Figure 4C:
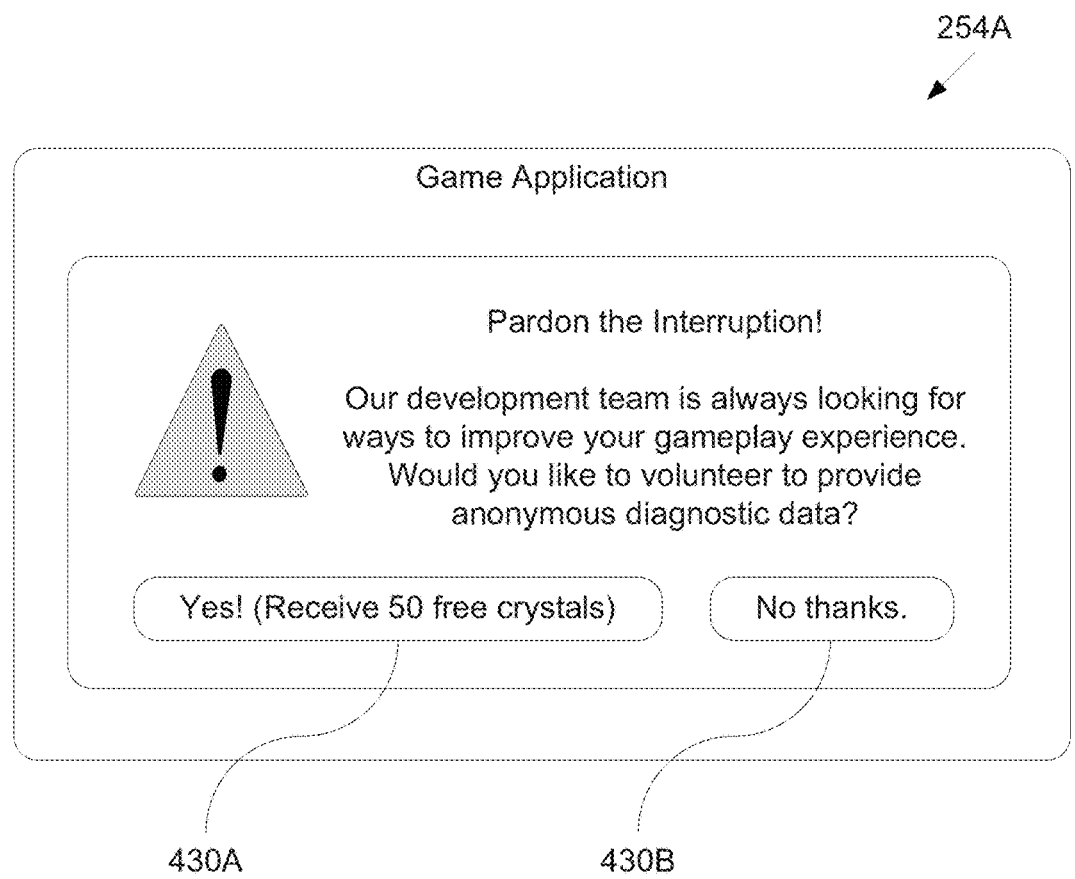
FIG. 4C and FIG. 4D illustrate example user interfaces in a production environment for performing quality assurance actions.

Before enabling the telemetry function, a prompt may be shown to the user, as illustrated in FIG. 4C. FIG. 4C illustrates an example user interface 254A in production environment 145 for performing a quality assurance action. User interface 254A may be displayed on display device 254 of client 110B. As shown in user interface 254A, the user is asked to provide telemetry data. To provide an incentive to the user, button 430A, for agreeing to the telemetry, may provide an in-game reward or currency, such as "50 free crystals." Otherwise, the user may decline by using button 430B.

Figure 4D:

In yet another example, the quality assurance action may trigger an auto-save function, as illustrated in FIG. 4D. FIG. 4D illustrates an example user interface 254B in a production environment for performing a quality assurance action. User interface 254B may be displayed on display device 254 of client 110B. As shown in user interface 254B, the user may have found a treasure chest containing the item "Wand of Foobar," as indicated by message 440A. Assuming that the priority cluster has an associated game parameter "player inventory includes Wand of Foobar," a similarity threshold may be met, and the auto-save function is triggered, as indicated by message 440B. In this manner, even if the "Wand of Foobar" causes a crash shortly thereafter, the user can at least backtrack to the auto-save without losing too much time or progress.

Other quality assurance actions may also be triggered, such as a soft reboot, e.g., for more action oriented game applications that may not store a large amount of persistent player state. In this manner, mitigating actions can be performed even for live deployments of the game application to reduce the impact of known bugs and issues for the player community. Further, the information gleaned from applying cluster groupings 244 to crash report database 135 can be used to efficiently guide quality assurance efforts, as illustrated in conjunction with FIG. 4B. Thus, the stability and reliability of the game application can be improved based on continuous feedback from crash report database 135.

Hardware Overview

Figure 5:
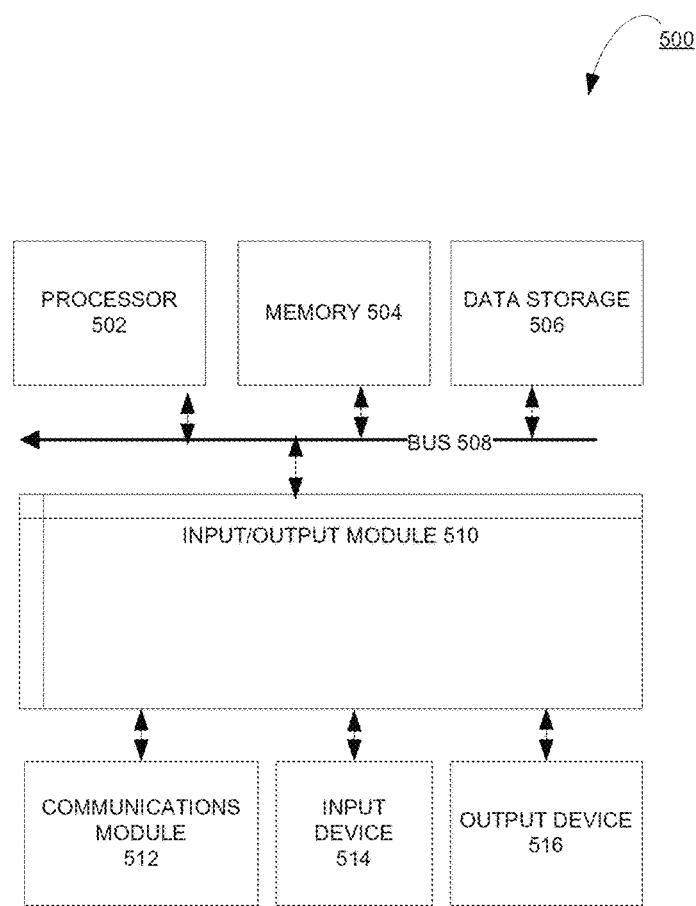
FIG. 5 is a block diagram illustrating an example computer system with which the clients and servers of FIG. 2 can be implemented.

FIG. 5 is a block diagram illustrating an example computer system 500 with which the client 110A, client 110B, and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110A, client 110B, and server 130) includes a bus 508 or other communication mechanism for communicating information, and a processor 502 (e.g., processor 212, 252, 236) coupled with bus 508 for processing information. According to one aspect, the computer system 500 can be a cloud computing server of an IaaS that is able to support PaaS and SaaS services. According to one aspect, the computer system 500 is implemented as one or more special-purpose computing devices. The special-purpose computing device may be hard-wired to perform the disclosed techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices, or any other device that incorporates hard-wired and/or program logic to implement the techniques. By way of example, the computer system 500 may be implemented with one or more processors 502. Processor 502 may be a general-purpose microprocessor, a microcontroller, a Digital Signal Processor (DSP), an ASIC, a FPGA, a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220, 260, and 240), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry. Expansion memory may also be provided and connected to computer system 500 through input/output module 510, which may include, for example, a SIMM (Single In Line Memory Module) card interface. Such expansion memory may provide extra storage space for computer system 500, or may also store applications or other information for computer system 500. Specifically, expansion memory may include instructions to carry out or supplement the processes described above, and may include secure information also. Thus, for example, expansion memory may be provided as a security module for computer system 500, and may be programmed with instructions that permit secure use of computer system 500. In addition, secure applications may be provided via the SIMM cards, along with additional information, such as placing identifying information on the SIMM card in a non-hackable manner.

The instructions may be stored in the memory 504 and implemented in one or more computer program products, e.g., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, embeddable languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network, such as in a cloud-computing environment. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices (e.g., input device 216, display device 214). The input/output module 510 can be any input/output module. Example input/output modules 510 include data ports such as USB ports. In addition, input/output module 510 may be provided in communication with processor 502, so as to enable near area communication of computer system 500 with other devices. The input/output module 510 may provide, for example, wired communication in some implementations, or wireless communication in other implementations, and multiple interfaces may also be used. The input/output module 510 is configured to connect to a communications module 512. Example communications modules 512 (e.g., communications module 218, 258, and 238) include networking interface cards, such as Ethernet cards and modems.

The components of the system can be interconnected by any form or medium of digital data communication (e.g., a communication network). The communication network (e.g., communication network 150) can include, for example, any one or more of a personal area. network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

For example, in certain aspects, communications module 512 can provide a two-way data communication coupling to a network link that is connected to a local network. Wireless links and wireless communication may also be implemented. Wireless communication may be provided under various modes or protocols, such as GSM (Global System for Mobile Communications), Short Message Service (SMS), Enhanced Messaging Service (EMS), or Multimedia Messaging Service (MMS) messaging, CDMA (Code Division Multiple Access), Time division multiple access (TDMA), Personal Digital Cellular (PDC), Wideband CDMA, General Packet Radio Service (CPRS), or LTE (Long-Term Evolution), among others. Such communication may occur, for example, through a radio-frequency transceiver. In addition, short-range communication may occur, such as using a BLUETOOTH, WI-FI, or other such transceiver.

In any such implementation, communications module 512 sends and receives electrical, electromagnetic, or optical signals that carry digital data streams representing various types of information. The network link typically provides data communication through one or more networks to other data devices. For example, the network link of the communications module 512 may provide a connection through local network to a host computer or to data equipment operated by an Internet Service Provider (ISP). The ISP in turn provides data communication services through the world wide packet data communication network now commonly referred to as the "Internet." The local network and :Internet both use electrical, electromagnetic, or optical signals that carry digital data streams. The signals through the various networks and the signals on the network link and through communications module 512, which carry the digital data to and from computer system 500, are example forms of transmission media.

Computer system 500 can send messages and receive data, including program code, through the network(s), the network link, and communications module 512. In the Internet example, a server might transmit a requested code for an application program through the Internet, the ISP, the local network, and communications module 512. The received code may be executed by processor 502 as it is received, and/or stored in data storage 506 for later execution.

In certain aspects, the input/output module 510 is configured to connect to a plurality of devices, such as an input device 514 (e.g., input device 216) and/or an output device 516 (e.g., display device 214). Example input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback, and input from the user can be received in any form, including acoustic, speech, tactile, or brain wave input. Example output devices 516 include display devices, such as an LED (light emitting diode), CRT (cathode ray tube), LCD (liquid crystal display) screen, a TFT LCD (Thin-Film-Transistor Liquid Crystal Display) or an OLED (Organic Light Emitting Diode) display, for displaying information to the user. The output device 516 may comprise appropriate circuitry for driving the output device 516 to present graphical and other information to a user.

According to one aspect of the present disclosure, the client 110A can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. Processor 502 may process the executable instructions and/or data structures by remotely accessing the computer program product, for example by downloading the executable instructions and/or data structures from a remote server through communications module 512 (e.g., as in a cloud-computing environment). In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. For example, some aspects of the subject matter described in this specification may be performed on a cloud-computing environment. Accordingly, in certain aspects, a user of systems and methods as disclosed herein may perform at least some of the steps by accessing a cloud server through a network connection. Further, data files, circuit diagrams, performance specifications, and the like resulting from the disclosure may be stored in a database server in the cloud-computing environment, or may be downloaded to a private storage device from the cloud-computing environment.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer-readable medium" as used herein refers to any medium or media that participates in providing instructions or data to processor 502 for execution. The term "storage medium" as used herein refers to any non-transitory media that store data and/or instructions that cause a machine to operate in a specific fashion. Such a medium may take many forms, including, but not limited to, non-volatile media, volatile media, and transmission media. Non-volatile media include, for example, optical disks, magnetic disks, or flash memory, such as data storage device 506. Volatile media include dynamic memory, such as memory 504. Transmission media include coaxial cables, copper wire, and fiber optics, including the wires that comprise bus 508. Common forms of machine-readable media include, for example, a floppy disk, a flexible disk, a hard disk, magnetic tape, any other magnetic medium, a CD-ROM, a DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

As used in this specification of this application, the terms "computer-readable storage medium" and "computer-readable media" are entirely restricted to tangible, physical objects that store information in a form that is readable by a computer. These terms exclude any wireless signals, wired download signals, and any other ephemeral signals. Storage media is distinct from but may be used in conjunction with transmission media. Transmission media participates in transferring information between storage media. For example, transmission media includes coaxial cables, copper wire, and fiber optics, including the wires that comprise bus 508. Transmission media can also take the form of acoustic or light waves, such as those generated during radio-wave and infra-red data communications. Furthermore, as used in this specification of this application, the terms "computer," "server," "processor," and "memory" all refer to electronic or other technological devices. These terms exclude people or groups of people. For the purposes of the specification, the terms display or displaying means displaying on an electronic device.

In one aspect, a method may be an operation, an instruction, or a function and vice versa. In one aspect, a clause or a claim may be amended to include some or all of the words (e.g., instructions, operations, functions, or components) recited in other one or more clauses, one or more words, one or more sentences, one or more phrases, one or more paragraphs, and/or one or more claims.

To illustrate the interchangeability of hardware and software, items such as the various illustrative blocks, modules, components, methods, operations, instructions, and algorithms have been described generally in terms of their functionality. Whether such functionality is implemented as hardware, software, or a combination of hardware and software depends upon the particular application and design constraints imposed on the overall system. Skilled artisans may implement the described functionality in varying ways for each particular application.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." Pronouns in the masculine (e.g., his) include the feminine and neuter gender (e.g., her and its) and vice versa. The term "some" refers to one or more. Underlined and/or italicized headings and subheadings are used for convenience only, do not limit the subject technology, and are not referred to in connection with the interpretation of the description of the subject technology. Relational terms such as first, second, and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public, regardless of whether such disclosure is explicitly recited in the above description. No claim element is to be construed under the provisions of 35 U.S.C. §112, sixth paragraph, unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

What is claimed is:

1. A computer-implemented method for improving application reliability by providing crash clustering with game state data, the method comprising:

receiving a plurality of crash reports associated with an application, wherein each of the plurality of crash reports comprises a call stack and a plurality of game state parameters;

determining, by a machine learning algorithm comprising k-medoids clustering, a plurality of clusters for grouping the plurality of crash reports, wherein each of the plurality of clusters is associated with at least one game state parameter of the plurality of game state parameters;

associating each of the plurality of crash reports with one of the plurality of clusters;

selecting a priority cluster from the plurality of clusters based on a number of crash reports associated with the priority cluster; and causing a quality assurance action to be performed on an instance of the application based on the at least one game state parameter associated with the priority cluster, wherein the quality assurance action is configuring a game state of the instance according to the at least one game state parameter associated with the priority cluster.

2. The method of claim 1, wherein the determining the plurality of clusters further determines an optimal number of the plurality of clusters.

3. The method of claim 1, wherein the plurality of game state parameters comprise at least one of a game mode, a game type, a location, a player action, a player statistic, or a hardware configuration.

4. The method of claim 1, wherein the quality assurance action is enabling a telemetry function when the game state of the instance is determined to meet a similarity threshold according to the at least one game state parameter associated with the priority cluster.

5. The method of claim 1, wherein the quality assurance action is triggering an auto-save function when the game state of the instance is determined to meet a similarity threshold according to the at least one game state parameter associated with the priority cluster.

6. The method of claim 1, wherein the quality assurance action is triggering a soft reboot of the instance when the game state of the instance is determined to meet a similarity threshold according to the at least one game state parameter associated with the priority cluster.

7. The method of claim 1, wherein the quality assurance action is performed automatically by a script.

8. The method of claim 1, wherein the instance of the application is executing in a test environment.

9. The method of claim 1, wherein the instance of the application is executing in a production environment on a client device.

10. The method of claim 1, wherein at least a portion of the plurality of crash reports are received from a plurality of client devices executing instances of the application in a production environment.

11. The method of claim 1, wherein the machine learning algorithm operates on a subset of the plurality of crash reports.

12. The method of claim 1, wherein the number of crash reports associated with the priority cluster is weighted by telemetry data.

13. A system for improving application reliability by providing crash clustering with game state data, the system comprising:
a memory; and
a processor configured to execute instructions which, when executed, cause the processor to:
receive a plurality of crash reports associated with an application, wherein each of the plurality of crash reports comprises a call stack and a plurality of game state parameters;
determine, by a machine learning algorithm, a plurality of clusters for grouping the plurality of crash reports, wherein each of the plurality of clusters is associated with at least one game state parameter of the plurality of game state parameters;
associate each of the plurality of crash reports with one of the plurality of clusters;
select a priority cluster from the plurality of clusters based on a number of crash reports associated with the priority cluster; and
cause a quality assurance action to be performed based on the at least one game state parameter associated with the priority cluster, wherein the quality assurance action is configuring a game state of the instance according to the at least one game state parameter associated with the priority cluster.

14. The system of claim 13, wherein the quality assurance action is performed on an instance of the application.

15. The system of claim 14, wherein the instance of the application is executing in a production environment on a client device, and wherein the quality assurance action is triggered when a game state of the instance is determined to meet a similarity threshold according to the at least one game state parameter associated with the priority cluster.

16. The system of claim 14, wherein the instance of the application is executing in a test environment, and wherein the quality assurance action is configuring a game state of the instance according to the at least one game state parameter associated with the priority cluster.

17. The system of claim 13, wherein the machine learning algorithm comprises k-medoids clustering.

18. The system of claim 13, wherein the plurality of game state parameters comprise at least one of a game mode, a game type, a location, a player action, a player statistic, or a hardware configuration.

19. A non-transitory machine-readable storage medium comprising machine-readable instructions for causing a processor to execute a method for improving application reliability by providing crash clustering with game state data, comprising:
receiving a plurality of crash reports associated with an application, wherein each of the plurality of crash reports comprises a call stack and a plurality of game state parameters comprising at least one of a game mode, a game type, a location, a player action, a player statistic, or a hardware configuration;
determining, by a machine learning algorithm comprising k-medoids clustering, a plurality of clusters for grouping the plurality of crash reports, wherein each of the plurality of clusters is associated with at least one game state parameter of the plurality of game state parameters;
associating each of the plurality of crash reports with one of the plurality of clusters;
selecting a priority cluster from the plurality of clusters based on a number of crash reports associated with the priority cluster; and
causing a quality assurance action to be performed based on the at least one game state parameter associated with the priority cluster, wherein the quality assurance action is configuring a game state of the instance according to the at least one game state parameter associated with the priority cluster.

* * * * *